United States Patent
Wasielewski, Jr.

(10) Patent No.: US 7,697,531 B2
(45) Date of Patent: Apr. 13, 2010

(54) ADDRESS REQUEST AUTHORITY PERCENTAGE PROTOCOL (ARAPP)

(75) Inventor: Michael Wasielewski, Jr., McLean, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 355 days.

(21) Appl. No.: 11/692,155

(22) Filed: Mar. 27, 2007

(65) Prior Publication Data

US 2008/0240099 A1   Oct. 2, 2008

(51) Int. Cl.
*H04L 12/56* (2006.01)

(52) U.S. Cl. .............. 370/392; 370/395.54; 370/401

(58) Field of Classification Search ............ 370/392
See application file for complete search history.

(56) References Cited

U.S. PATENT DOCUMENTS

| | | | |
|---|---|---|---|
| 6,400,719 B1 * | 6/2002 | Chimura et al. | 370/395.31 |
| 6,970,926 B1 * | 11/2005 | Needham et al. | 709/225 |
| 6,988,148 B1 * | 1/2006 | Sheth | 709/245 |
| 7,072,337 B1 * | 7/2006 | Arutyunov et al. | 370/389 |
| 7,529,540 B2 * | 5/2009 | Cox et al. | 455/414.1 |
| 2006/0028996 A1 * | 2/2006 | Huegen et al. | 370/252 |

* cited by examiner

*Primary Examiner*—Dang T Ton
*Assistant Examiner*—Pamit Kaur
(74) *Attorney, Agent, or Firm*—Ronald E. Prass, Jr.; Prass LLP

(57) ABSTRACT

A method and apparatus that routes packets in a network is disclosed. The method may include receiving a packet from a first communication device in the network requesting an IP address, determining if another communication device owns the requested IP address, wherein if another communication device does not own the requested IP address, giving the IP address to the first communication device, otherwise, if it is determined that a second communication device is claiming ownership of the IP address, determining whether the first communication device or the second communication device owns the IP address using an address request authority percentage protocol (ARAPP) function, wherein based on the results of the ARAPP function, the first communication device is given the IP address, otherwise the IP address request from the first communication device is denied.

12 Claims, 6 Drawing Sheets

ADDRESS REQUEST AUTHORITY PERCENTAGE PROTOCOL (ARAPP)

BACKGROUND OF THE INVENTION

1. Field of the Invention

The invention relates to network communications, and in particular, to resolving network conflicts concerning Internet Protocol (IP) addresses.

2. Introduction

Many of today's corporations have migrated to IPv6. One of the major changes available in IPv6 is the ability for one interface to obtain and control multiple IP addresses. However, this poses a problem for DHCPv6 and Auto-Address Configuration. If an attacker gains access to a network, the culprit can effectively perform a Denial of Service attack by responding to all Neighbor Solicitation (NS) Packets with the corresponding Neighbor Advertisements (NA) claiming to own the IP address. Standard measures available in IPv4 will not suffice since IPv6 sometimes demands that an interface be granted multiple IP addresses.

SUMMARY OF THE INVENTION

A method and apparatus that routes packets in a network is disclosed. The method may include receiving a packet from a first communication device in the network requesting an IP address, determining if another communication device owns the requested IP address, wherein if another communication device does not own the requested IP address, giving the IP address to the first communication device, otherwise, if it is determined that a second communication device is claiming ownership of the IP address, determining whether the first communication device or the second communication device owns the IP address using an address request authority percentage protocol (ARAPP) function, wherein based on the results of the ARAPP function, the first communication device is given the IP address, otherwise the IP address request from the first communication device is denied.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

This invention concerns the use of an address request authority percentage protocol (ARAPP) in network communications. The ARAPP is used to allow the switch to act as a mediator to claims of existing IP addresses on the network. Each time a change condition is met, the switch may alter the value of the ARAPP for that switchport. When two nodes both claim an IP address, the switch may then compare the respective ARAPP values to determine who should receive ownership of that address. This process is explained further below.

Figure 1:
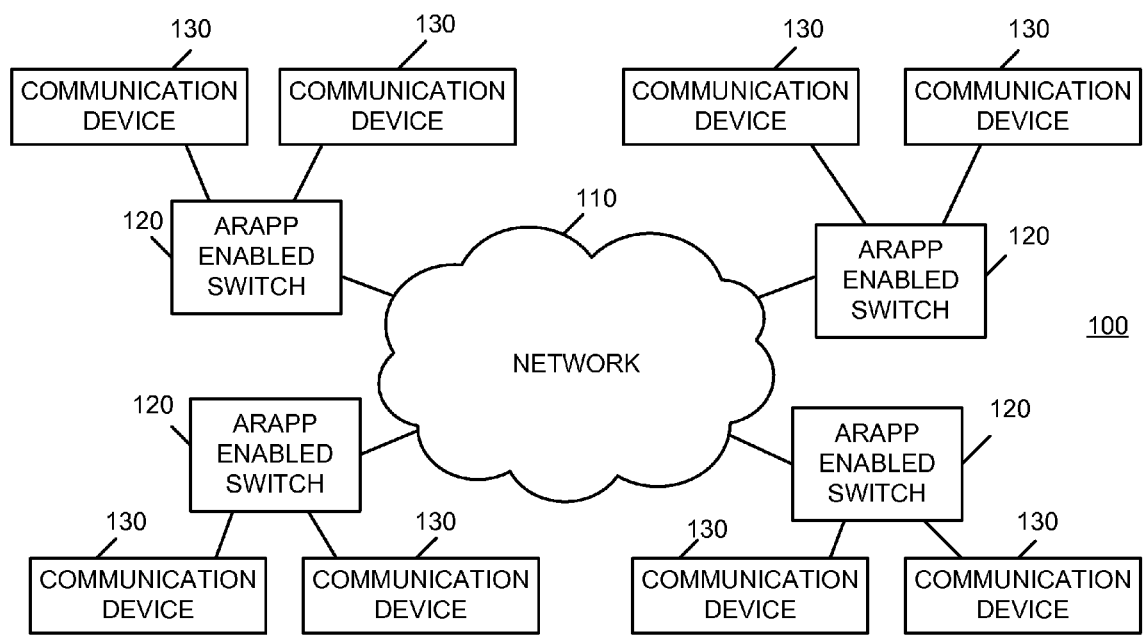
FIG. 1 illustrates an exemplary diagram of an ARAPP-enabled network in accordance with a possible embodiment of the invention.

FIG. 1 illustrates an exemplary diagram of an ARAPP-enabled network environment 100 in accordance with a possible embodiment of the invention. In particular, the ARAPP-enabled network 100 may include a plurality of communication devices 130 each connected to one of a plurality of ARAPP enabled switches 120 which are connected through network 110.

One of skill in the art will appreciate that the network 110 may be any possible configuration in which a communication device 110 may be communicate with other network devices. As such, the network 110 may represent any communication and/or media network, such as the Internet, intranet, telephone network, cable television network, satellite television network, satellite radio network or any other network system known to one of skill in the art, for example.

The communication device 130 may represent any device that communicates through a network and may have an IP address, including a personal computer, laptop/portable computer, digital video recorder, personal digital assistant (PDA), etc., for example.

Figure 2:
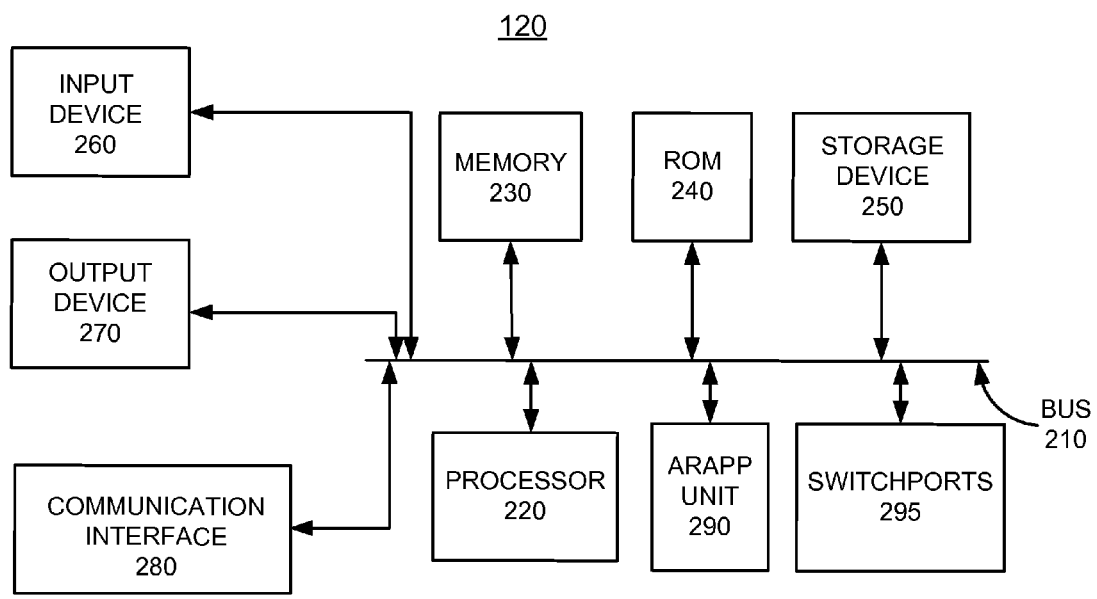
FIG. 2 illustrates a block diagram of an exemplary an ARAPP enabled switch in accordance with a possible embodiment of the invention.

FIG. 2 illustrates a block diagram of an exemplary ARAPP enabled switch 120 illustrated in FIG. 1 in accordance with a possible embodiment of the invention. The ARAPP enabled switch 120 may represent any switch, router, computer, or other network device that receives, routes, and forwards packets to/from other network devices. The ARAPP enabled switch 120 may include a plurality of switchports 295. The ARAPP enabled switch 120 may be configured with the ability to maintain tables on a per switchport basis that includes the IP addresses broadcasted out by that port, the MAC addresses broadcasted out by that port, a number between 0 and 1 to three decimal places, known as the ARAPP percentage, and a timestamp.

The ARAPP enabled switch 120 may include may include a bus 210, a processor 220, a memory 230, a read only memory (ROM) 240, a storage device 250, an input device 260, an output device 270, a communication interface 280, an ARAAP unit 290, and a plurality of switchports 295. Bus 210 may permit communication among the components of the remote media content server 180.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 260 may include any mechanism that facilitates communication via the network 110. For example, communication interface 260 may include a modem. Alternatively, communication interface 260 may include other mechanisms for assisting in communications with other devices and/or systems.

ROM 240 may include a conventional ROM device or another type of static storage device that stores static information and instructions for processor 220. Storage device 250 may include any type of storage media, such as, for example, magnetic or optical recording media and its corresponding drive.

Input device 260 may include one or more conventional mechanisms that permit a user to input information to the ARAPP enabled switch 120, such as a keyboard, a mouse, a pen, a voice recognition device, touchpad, buttons, etc. Output device 270 may include one or more conventional mechanisms that output information to the user, including a display, a printer, one or more speakers, or a medium, such as a memory, or a magnetic or optical disk and a corresponding disk drive. Input device 260 and output device 270 may also include switchports 295.

The ARAPP enabled switch 120 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 260.

In order to accommodate the different types of devices on the network 110, several default configurations may be provided, with the ability for a user to create custom groups. Also, existing groups may be modifiable. As such, the following groups may be implemented by all developers:

Host: A switchport 295 defined as a "Host" switchport may be expecting a total of 1 MAC address and 5 IP addresses. The initial value for the ARAPP for a Host is 70%. This is to allow for the possibility in IPv6 that 1 interface can have multiple IP addresses.

Server: A switchport 295 defined as a "Server" switchport may be expecting a total of 1 MAC address and 20 IP addresses. The initial value for the ARAPP for a Server is 80%. This is to ensure the flexibility provided in IPv6 does not get stunted by this protocol and instead allows for servers providing services to utilize multiple IP addresses.

Switch: A switchport 295 defined as a "Switch" switchport may be expecting a total of 24 MAC addresses and 300 IP addresses. The initial value for the ARAP for a Switch is 90%. These numbers are based on a 24 port switch with a combination of Hosts and Servers. Since this protocol is only meant to be implemented on the first or second ring from the outside, not much more should be allocated. Although not always needed, this designation exists so that if one switch becomes corrupted it can not bypass the protocol by ignoring ARAPP rules.

Router: A switchport 295 defined as a "Router" switchport may be expecting any number of MAC addresses and any number of IP addresses. The initial value for the ARAPP for a Router is 100%. This designation is used as the catch all to ensure that a misconfiguration or hacker can not try to exploit a default setting set by a vendor.

User-Defined: The User-Defined portion allows administrators to define their own parameters and expectations from their networks, and then assign switchports 295 to these new designations. One such example would be an interface allowing for 2 MAC addresses and 7 IP address, a standard configuration for a VOIP phone connected to a workstation.

The ARAPP enabled switch 120 illustrated in FIGS. 1 and 2 and the related discussion are intended to provide a brief, general description of a suitable communication and processing environment in which the invention may be implemented. Although not required, the invention will be described, at least in part, in the general context of computer-executable instructions, such as program modules, being executed by the ARAPP enabled switch 120, such as a communication server, communications switch, communications router, or general purpose computer, for example. Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including personal computers, hand-held devices, multi-processor systems, microprocessor-based or programmable consumer electronics, and the like.

For illustrative purposes, the operation of the ARAPP enabled switch 120 and ARAPP communication processes will be described below in relation to the block diagrams shown in FIGS. 1 and 2.

Figure 3:
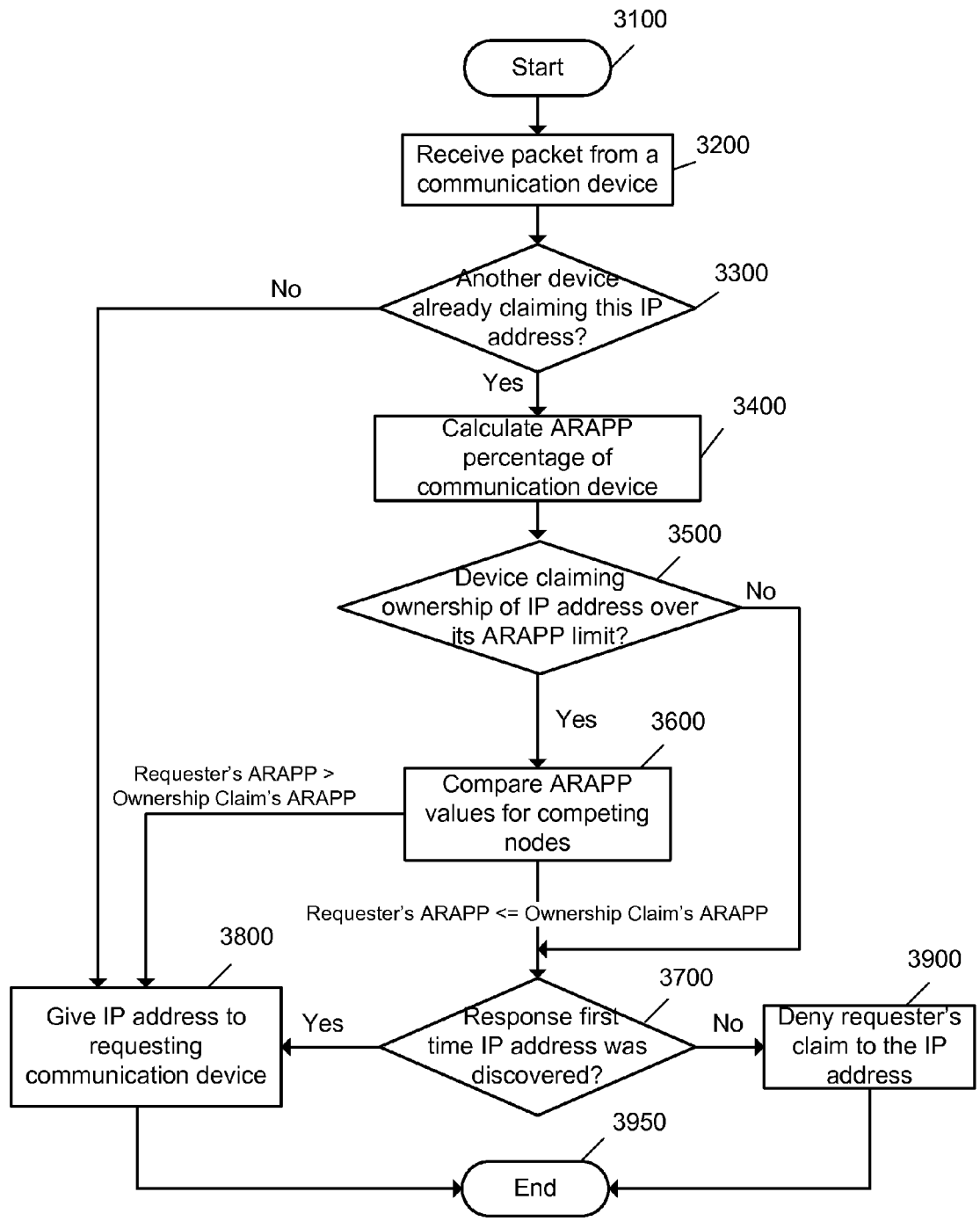
FIG. 3 is an exemplary flowchart illustrating one possible ARAPP transmission process in accordance with one possible embodiment of the invention.

FIG. 3 is an exemplary flowchart illustrating one possible ARAPP communication process in accordance with one possible embodiment of the invention. The process begins at step 3100 and goes to step 3200 where the ARAPP unit 290 in the ARAPP enabled switch 120 receives a packet from a communication device 130 requesting an IP address. At step 3300, the ARAPP unit 290 determines if another communication device is claiming the requested IP address.

If the ARAPP unit 290 determines that another communication device is not claiming the requested IP address, the process goes to step 3800 and the ARAPP unit 290 allows the request to continue and gives the IP address to the requesting communication device 130. The process then goes to step 3950 and ends.

If at step 3300, the ARAPP unit 290 determines that another communication device 130 is claiming the requested IP address, at step 3400, the ARAPP unit calculates the ARAPP percentage of the communication device 130.

The ARAPP percentage is defined as the mathematical representation of the level of trust held by an ARAPP enabled switch 120 in regards to the information being sent by its switchport 295. The ARAPP percentage or value is derived from an initial value that is degraded or improved based on the actions of that switchport 295. The conditions for automatically degrading the ARAPP value may be as follows:

Requesting a number of IP address above the total number of expected IP addresses Responding to the IP request of another computer after reaching the total number of expected IP addresses Sending an IP request with an accompanying MAC address after reaching the total number of expected MAC addresses Responding to an IP request with a new accompanying MAC address after reaching the total number of expected MAC addresses In order to automatically increase the ARAP value, the following conditions may occur:

Maintained a specific period of time in which the port did not exceed the expected number of IP addresses Maintained a specific period of time in which the port did not exceed the expected number of MAC addresses Maintained a specific period of time in which the port did not request another IP after exceeding the expected number of IP addresses Maintained a specific period of time in which the port did not claim to have another MAC after exceeding the expected number of MAC addresses At step 3500, the ARAPP unit 120 determines if the communication device 130 claiming ownership of the IP address is over its ARAPP limit. If the ARAPP unit 290 determines that the communication device 130 claiming ownership of the IP address is not over its ARAPP limit, then the process goes to step 3700 where the ARAPP unit 290 determines whether the response from the communication device 130 claiming the IP address was the first time the IP address was discovered.

If the ARAPP unit 290 determines that the response from the communication device 130 claiming the IP address was not the first time the IP address was discovered, and the process goes to step 3900 and the ARAPP unit 290 denies the requesting communication device's 130 request for the IP address. The process then goes to step 3950 and ends.

If at step 3700 the ARAPP unit 290 determines that the response from the communication device 130 claiming the IP address was the first time the IP address was discovered, then the process goes to step 3800 and the ARAPP unit 290 allows the request to continue giving the IP address to the requesting communication device 130. The process then goes to step 3950 and ends.

If at step 3500, the ARAPP unit 290 determines that the communication device 130 claiming ownership of the IP address is over its ARAPP limit, then the process goes to step 3600 were the ARAPP unit 290 compares ARAPP values for the competing communication devices. If the ARAPP unit 290 determines that the requesting communication device's ARAPP value is greater than the ARAPP value of the communication device 130 claiming ownership of the IP address, then the process goes to step 3800 and the ARAPP unit 290 gives the IP address to the requesting communication device 130. The process goes to step 3950 and ends.

If at step 3600, the ARAPP unit 290 determines that the requesting communication devices 130 ARAPP value is less than or equal to the ARAPP value of the communication device 130 requesting ownership of the IP address, then the process proceeds to step 3700 where the ARAPP unit 290 determines if the response received from the communication device 130 claiming ownership of the IP address was the first time the IP address was discovered. This process is discussed above and in the interest of brevity, will not be repeated here. After the process in steps 3700-3900, is complete, the process then goes to step 3950 and ends.

Figure 4:
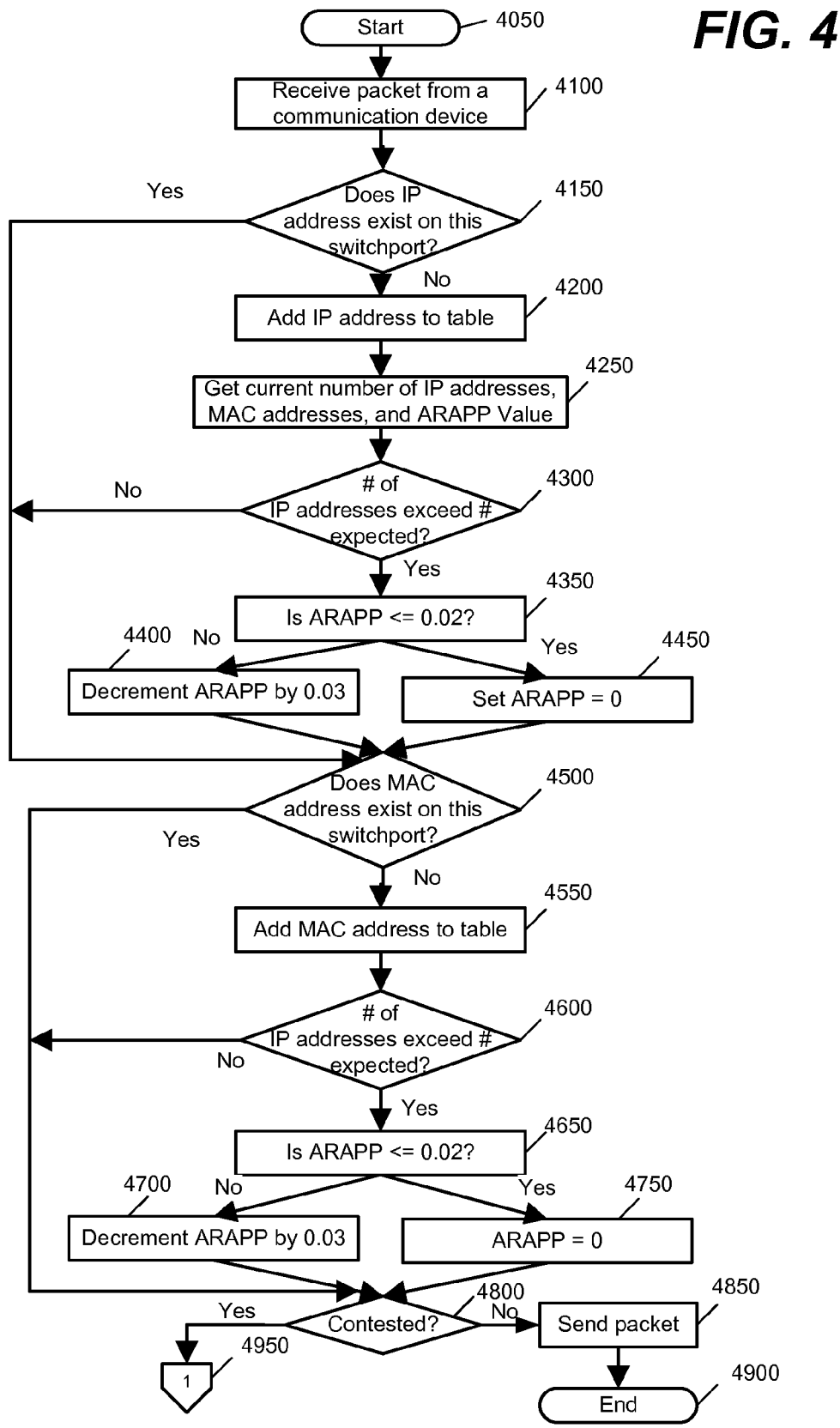
FIG. 4 is an exemplary flowchart illustrating one possible uncontested ARAPP communication process in accordance with one possible embodiment of the invention.

FIG. 4 is an exemplary flowchart illustrating one possible uncontested ARAPP communication process in accordance with one possible embodiment of the invention. The process begins at step 4050 and continues to step 4100 where the ARAPP unit 290 in the ARAPP enabled switch 120 receives a packet from a communication device 130 requesting an IP address. At step 4150, the ARAPP unit 290 determines if the IP address exists on the ARAPP enabled switch 120 or switchport 295. If the ARAPP unit 290 determines that the IP address exists on the ARAPP enabled switch, the process goes to step 4500 were the ARAPP unit 290 determines if a MAC address exists on the ARAPP enabled switch 120. This MAC address determination process will be described further below.

If at step 4150 the ARAPP unit 290 determines that the requested IP address does not exist on the ARAPP enabled switch 120, then at step 4200 the ARAPP unit 290 adds the IP address to its IP address table. At step 4250, the ARAPP unit 290 gets the current number of IP addresses, MAC addresses and ARAPP value.

At step 4300, the ARAPP unit 290 determines if the number of IP addresses of the requesting communication device 130 exceeds the number expected.

If the ARAPP unit 290 determines that the number of IP addresses does not exceed a number of IP addresses expected, the process goes to step 4500 were the ARAPP unit 290 determines if a MAC address exists on the ARAPP enabled switch 120. This MAC address determination process will be discussed further below.

If at step 4300 the ARAPP unit 290 determines that the number of IP addresses exceed the number of expected IP addresses, then at step 4350 the ARAPP unit 290 determines if the ARAPP that you is less than or equal to 0.02. If the ARAPP unit 290 determines that the ARAPP value is less than or equal to 0.02, then at step 4450, the ARAPP unit 290 sets the ARAPP value to zero. If the ARAPP unit 290 determines that the ARAPP value is not less than or equal to 0.02, then at step 4400 the ARAPP unit 290 decrements the ARAPP value by 0.03.

The process then goes to step 4500 where the above processes for IP addresses are repeated for MAC addresses in steps 4500 through 4750. In the interest of brevity those steps need not be repeated here.

At step 4800, the ARAPP unit 290 determines if the IP address is contested such that another communication device in the network is claiming the requested IP address. If the ARAPP unit 290 determines that no other network devices are claiming the requested IP address, then at step 4850 the ARAPP unit 290 sends the packet to its next destination using the requested IP address. The process then goes to step 4900 and ends.

Figure 5:
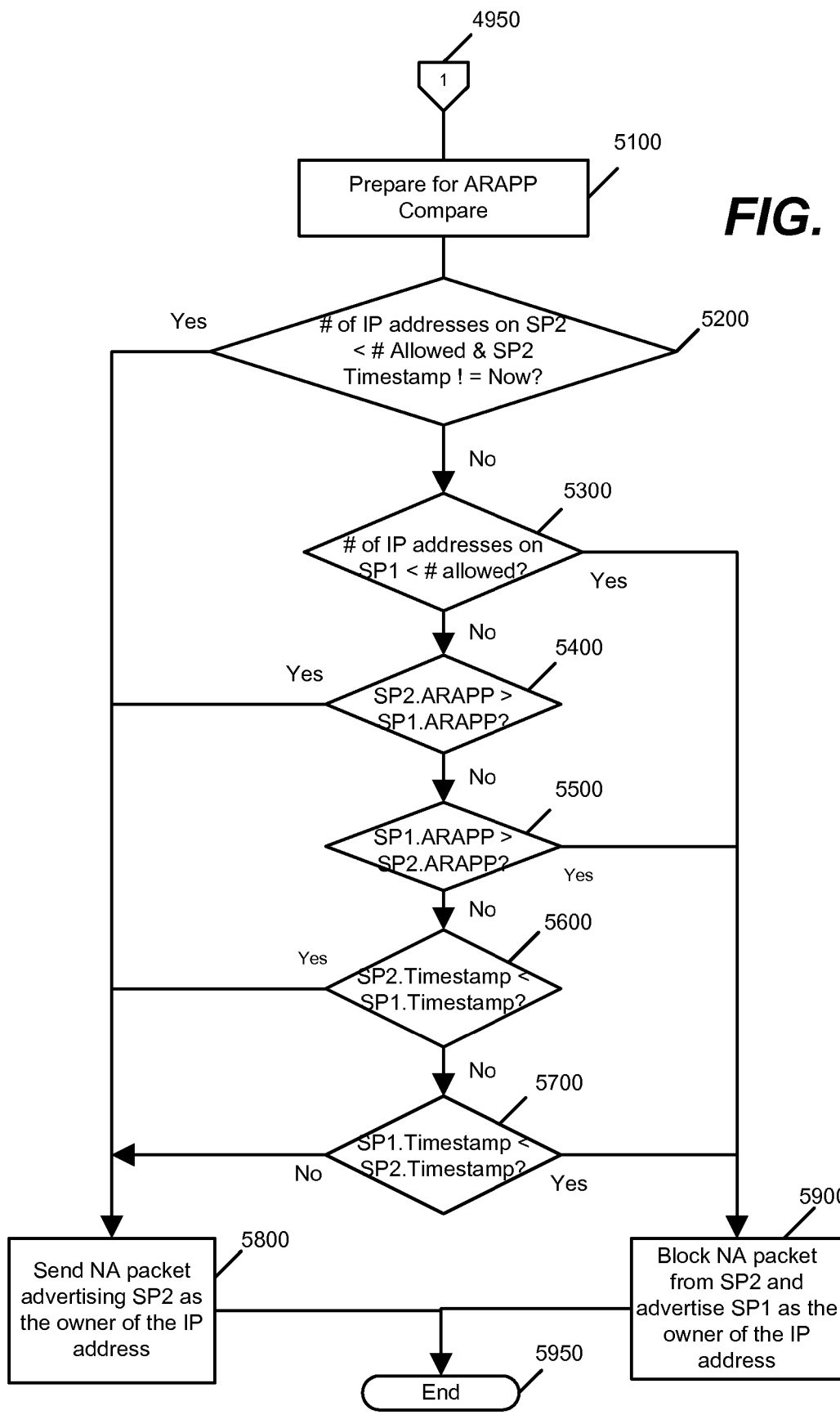
FIG. 5 is an exemplary flowchart illustrating one possible contested ARAPP communication process in accordance with one possible embodiment of the invention.

If in step 4800 the ARAPP unit 290 determines that another communication device 130 in the network is claiming the requested IP address and as such, the IP addresses contested, the process goes to step 4950 which is covered in FIG. 5.

Thus, in this case, we can see that another communication device 130 responding to a request with the claim that it owns the IP address, also follows the same procedure. First, the IP address is checked, followed by the MAC address, and the appropriate steps are taken.

However, a dilemma arises where the ARAPP enabled switch 120 must decide who gets the IP address. Since we have degraded the ARAPP value where appropriate, we now use an ARAPP compare process below which will determine who gets the IP address. In such cases, the communication device 130 who claims to have already own the IP address gets precedence. This process is explained in relation to FIG. 5.

FIG. 5 is an exemplary flowchart illustrating one possible contested ARAPP communication process in accordance with one possible embodiment of the invention. From step 4950, the process goes to step 5100 where the ARAPP unit 290 prepares for an ARAPP compare process between the two communication devices 130 requesting the IP address (termed "S1" for the communication device 130 on switchport 1) and the communication device claiming ownership of the IP address (termed "S2" for the communication device 130 on switchport 2).

At step 5200, the ARAPP unit 290 determines if the number of IP addresses on SP2 is less then the number allowed and also determines if the timestamp is current. If the ARAPP unit 290 determines that the number of IP addresses on SP2 is less than the number allowed and the timestamp is not equal to the current time, indicating that this is not the first time the switch has heard of this IP for this switchport, and the process goes to step 5800 where the ARAPP unit 290 sends a neighbor advertisement packet advertising SP2 as the owner of the IP address.

If at step 5200 the ARAPP unit 290 determines that either the number of IP addresses on SP2 is not less than the number allowed or SP2's timestamp would indicate that this is a new announcement, the process goes to step 5300 were the ARAPP unit 290 determines if the number of IP addresses on SP1 is less than or equal to the number allowed. If at step 5300 the ARAPP unit 290 determines that the number of IP addresses on SP1 is less then the number of IP addresses allowed, the process goes to step 5900 where the ARAPP unit 290 blocks the neighbor advertisement packet from SP2 and advertisers SP1 as the owner of the IP address.

If at step 5300 the ARAPP unit 290 determines that the number of IP addresses on SP1 is not less then the number of IP addresses allowed, the process goes to step 5400 were the ARAPP unit 290 determines if the SP2 ARAPP value is greater than the SP1 ARAPP value. If at step 5400 the ARAPP unit 290 determines that the ARAPP value of SP2 is greater than the ARAPP value of SP1, the process goes to step 5800 were the ARAPP unit 290 sends a network advertisement neighbor advertisement packet advertising SP2 is the owner of the IP address.

If at step 5400 the ARAPP unit 290 determines that the ARAPP value of SP2 is not greater than the ARAPP value of SP1, the process goes to step 5500 were the ARAPP unit 290 determines if the ARAPP value of SP1 is greater than the ARAPP value of SP2. If the ARAPP unit 290 determines that the ARAPP value of SP1 is greater than the ARAPP value of SP2 the process goes to step 5900 where the ARAPP unit 290 blocks the neighbor advertisement packet from SP two and advertises SP1 as the owner of the IP address.

If it step 5500 the ARAPP unit 290 determines that the ARAPP value of SP1 is not greater than the ARAPP value of SP2, the process goes to step 5600 were the ARAPP unit 290 determines if the timestamp of SP2 is less than the timestamp of SP1. If the ARAPP unit 290 determines that the timestamp of SP2 is less than the timestamp of SP1, the process goes to step 5800 and the ARAPP unit 290 sends a neighbor advertisement packet advertising SP2 as the owner of the IP address.

If at step 5600 the ARAPP unit 290 determines that the timestamp of SP2 is not less than the timestamp of SP1, the process goes to step 5700 where the ARAPP unit 290 determines if the timestamp of SP1 is less than the timestamp of SP2. If the ARAPP unit 290 determines that the timestamp of SP1 is not less than the timestamp of SP2, the process goes to step 5800 and where the ARAPP unit 290 sends the neighbor advertisement packet advertising SP2 as the owner of the IP address.

If the ARAPP unit 290 determines that the timestamp of SP1 is less than the timestamp of SP2, the process goes to step 5900 were the ARAPP unit 290 blocks the neighbor advertisement packet from SP1 and advertises SP2 is the owner of the IP address. The process then goes to step 5950 and ends.

Thus, in the case where two communication devices 130 claim to have or want the same IP address, the ARAPP enabled switch 120 makes the determination first based on the number of addresses currently held by each requestor, with precedence going to the communication device 130 who claims to already ownership.

However, one caveat is that the first time hearing about this IP address from the "owner" must not be when the most recent packet was received. If both communication devices 130 are over the IP address limit, then the ARAPP values are compared to see whose is greater, and subsequently, which communication device 130 receives the address.

Next, the timestamps are checked. If the first time the IP address appeared on the switchport was in the response from the communication device 130 claiming ownership, that response is considered an error and it is ignored. If the IP address was already noted by the switchport, then it is considered valid. If the ARAPP and timestamp values are equal, the IP address is given to the person who claims to already have ownership.

In some cases however, this process might have to occur across a network involving two different ARAPP enabled switches 120. When this is the case, the ARAPP enabled switches 120 must communicate the ARAPP value and timestamp for the requesting or responding switchport. To do this, a new packet is created. It is also noted that any switch that cannot provide an ARAPP value may have their requests be treated at one-half the default value of the switch that can provide a value.

The process for sending and receiving is simple. If a neighbor advertisement (NA) or neighbor solicitation (NS) comes across a switchport labeled "switch", and a NA/NS is broadcasted in response from that switch, then the ICMPv6 ARAPP value packet may be sent along the original switchport. If the switchport is labeled incorrectly, the value in the ARAPP table will be severely affected.

When the NA/NS is received across a link, the ARAPP enabled switch 120 that receives the packet and gets a challenge will send the first ICMPv6 ARAPP value packet to the link on which the initial packet was received, along with the NA/NS packet that generated the ARAPP packet. The ARAPP enabled switch 120 that receives this packet replies with the ICMPv6 ARAPP value packet containing the values of the switchport that last sent out a NA/NS packet.

The ARAPP enabled switch 120 only needs to send the packet, and calculate the value off the packet received from the other switch. The ICMPv6 ARAPP value packet may only be accepted from the switchport the request or response originated from. Once it has received the packet, it follows the previously mentioned logic process in FIG. 5 using the information gathered from the packet.

The ARAPP enabled switches 120 may also keep track of the number of IP and MAC addresses broadcasted by each switch in order to ensure that a corrupted or improperly configured switch does not detriment the entire network. To do this, the ARAPP enabled switch 120 must perform the basic degradation function for the switchport as shown and discussed in relation to FIG. 4.

Figure 6:
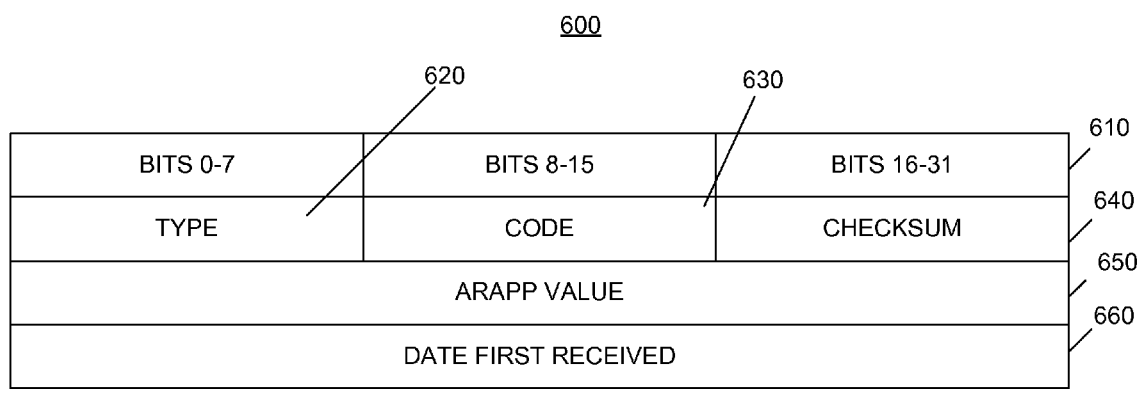
FIG. 6 is an exemplary diagram of a possible ARAPP ICMP packet in accordance with one possible embodiment of the invention.

FIG. 6 is an exemplary diagram of a possible ARAPP packet 600 in accordance with one possible embodiment of the invention. The packet may include blocks for bits values 610, type 620, code 630, checksum 640, ARAPP value 650, and date first received 660. The type may be 130, for example. The code may be zero, for example. The checksum 640 may be calculated as defined in the ICMPv6 RFC 2463, for example.

The ARAPP value 650 may be the 32 bit unsigned integer representation of the three-decimal ARAPP value (0.000). The date first received 660 may be a 64 bit unsigned integer field containing a timestamp. This timestamp is to be the time in the switchport table at which the IP address requested or MAC address was first broadcasted by that port.

The date first received 660 value may indicate the number of seconds since Jan. 1, 1970, 00:00 UTC, by using a fixed point format using a 64 bit integer, similar to the one found in RFC 1 "Secure Neighbor Discovery". In this format, the integer number of seconds may be contained in the first 48 bits of the field, and the remaining 16 bits may indicate the number of 1/64K fractions of a second.

This ARAPP packet 600 may be sent by the ARAPP enabled switches 120 to communicate the ARAPP value of a switchport between switches. This packet must have its checksum 640 validated before processing.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the ARAPP unit 290 in FIGS. 1-2 each processing the content in various possible ways. It does not necessarily need to be one system used by all end users. Accordingly, the appended claims and their legal equivalents should only define the invention, rather than any specific examples given.

I claim:

1. A method for routing packets in a network, comprising:
   receiving a packet from a first communication device in the network requesting an IP address;
   determining if another communication device owns the requested IP address, wherein if the another communication device does not own the requested IP address, giving the IP address to the first communication device,
   otherwise, if it is determined that a second communication device is claiming ownership of the IP address,
   determining whether the first communication device or the second communication device owns the IP address using at least one of an address request authority percentage protocol (ARAPP) function and a timestamp,
   wherein the ARAPP function comprises calculating an ARAPP percentage for the first and second communication devices, the ARAPP percentage being a measured level of trust, and comparing at least one of the ARAPP percentages and timestamps between the first and second communication devices, wherein if the ARAPP percentage for the first communication device is greater than the ARAPP percentage for the second communication device, and the timestamp of the first communication device is higher than the timestamp of the second communication device, the IP address is given to the first communication device,
   wherein the ARAPP percentage is calculated from an initial value that is automatically degraded or improved based on previous actions of a switchport with regard to one of the first and second communication devices,
   wherein the previous actions that cause the ARAPP percentage to be automatically degraded are at least one of requesting a number of IP address above a total number of expected IP addresses, responding to an IP request of another computer after reaching the total number of expected IP addresses, sending an IP request with an accompanying MAC address after reaching the total number of expected MAC addresses, and responding to an IP request with a new accompanying MAC address after reaching the total number of expected MAC addresses,
   wherein the previous actions that cause the ARAPP percentage to be automatically improved are at least one of maintaining a specific period of time in which the switchport did not exceed an expected number of IP addresses, maintaining a specific period of time in which the switchport did not exceed an expected number of MAC addresses, maintaining a specific period of time in which the switchport did not request another IP after exceeding the expected number of IP addresses, and maintaining a specific period of time in which the switchport did not claim to have another MAC after exceeding the expected number of MAC addresses.

2. The method of claim 1, wherein if the ARAPP percentage for the first communication device is not greater than the ARAPP percentage for the second communication device,
   determining if the IP address was previously discovered,
   wherein if the IP address was not previously discovered, the IP address is given to the first communication device, otherwise IP address request from the first communication device is denied.

3. The method of claim 1, further comprising:
determining if the first communication device is claiming to own IP addresses above its IP address limit.

4. The method of claim 1, further comprising:
determining if at least one of an IP address and a MAC address exists on a switchport.

5. A computer readable medium being a non transitory signal storing instructions for controlling a computing device for routing packets in a network, the instructions comprising:
receiving a packet from a first communication device in the network requesting an IP address;
determining if another communication device owns the requested IP address, wherein if the another communication device does not own the requested IP address, giving the IP address to the first communication device, otherwise, if it is determined that a second communication device is claiming ownership of the IP address,
determining whether the first communication device or the second communication device owns the IP address using at least one of an address request authority percentage protocol (ARAPP) function and a timestamp,
wherein the ARAPP function comprises calculating an ARAPP percentage for the first and second communication devices, the ARAPP percentage being a measured level of trust, and comparing at least one of the ARAPP percentages and timestamps between the first and second communication devices, wherein if the ARAPP percentage for the first communication device is greater than the ARAPP percentage for the second communication device, and the timestamp of the first communication device is higher than the timestamp of the second communication device, the IP address is given to the first communication device,
wherein the ARAPP percentage is calculated from an initial value that is automatically degraded or improved based on previous actions of a switchport with regard to one of the first and second communication devices,
wherein the previous actions that cause the ARAPP percentage to be automatically degraded are at least one of requesting a number of IP address above a total number of expected IP addresses, responding to an IP request of another computer after reaching the total number of expected IP addresses, sending an IP request with an accompanying MAC address after reaching the total number of expected MAC addresses, and responding to an IP request with a new accompanying MAC address after reaching the total number of expected MAC addresses,
wherein the previous actions that cause the ARAPP percentage to be automatically improved are at least one of maintaining a specific period of time in which the switchport did not exceed an expected number of IP addresses, maintaining a specific period of time in which the switchport did not exceed an expected number of MAC addresses, maintaining a specific period of time in which the switchport did not request another IP after exceeding the expected number of IP addresses, and maintaining a specific period of time in which the switchport did not claim to have another MAC after exceeding the expected number of MAC addresses.

6. The computer-readable medium of claim 5, wherein if the ARAPP percentage for the first communication device is not greater than the ARAPP percentage for the second communication device,
determining if the IP address was previously discovered, wherein if the IP address was not previously discovered, the IP address is given to the first communication device, otherwise IP address request from the first communication device is denied.

7. The computer-readable medium of claim 5, farther comprising:
determining if the first communication device is claiming to own IP addresses above its IP address limit.

8. The computer-readable medium of claim 5, further comprising:
determining if at least one of an IP address and a MAC address exists on a switchport.

9. An apparatus that routes packets in a network, comprising:
at least one or more switchports; and
an ARAPP unit that receives a packet on one of the switchports from a first communication device in the network requesting an IP address, determines if another communication device is claiming ownership of the requested IP address, wherein if the another communication device does not own the requested IP address, the ARAPP unit gives the IP address to the first communication device, otherwise, if it is determined that a second communication device is claiming ownership of the IP address, the ARAPP unit determines whether the first communication device or the second communication device owns the IP address using at least one of an address request authority percentage protocol (ARAPP) function and a timestamp,
wherein in performing the ARAPP function, the ARAPP unit calculates an ARAPP percentage for the first and second communication devices, the ARAPP percentage being a measured level of trust, and compares at least one of the ARAPP percentages and timestamps between the first and second communication devices, wherein if the ARAPP percentage for the first communication device is greater than the ARAPP percentage for the second communication device, and the timestamp of the first communication device is higher than the timestamp of the second communication device, the ARAP unit gives the IP address to the first communication device,
wherein the ARAPP unit calculates the ARAPP percentage from an initial value that the ARAPP unit automatically degrades or improves based on previous actions of a switchport with regard to one of the first and second communication devices,
wherein the previous actions that cause the ARAPP unit to automatically degrade the ARAPP percentage are at least one of requesting a number of IP address above a total number of expected IP addresses, responding to an IP request of another computer after reaching the total number of expected IP addresses, sending an IP request with an accompanying MAC address after reaching the total number of expected MAC addresses, and responding to an IP request with a new accompanying MAC address after reaching the total number of expected MAC addresses,
wherein the previous actions that cause the ARAPP unit to automatically improve the ARAPP percentage are at least one of maintaining a specific period of time in which the switchport did not exceed an expected number of IP addresses, maintaining a specific period of time in which the switchport did not exceed an expected number of MAC addresses, maintaining a specific period of time in which the switchport did not request another IP after exceeding the expected number of IP addresses, and maintaining a specific period of time in which the switchport did not claim to have another MAC after exceeding the expected number of MAC addresses.

10. The apparatus of claim 9, wherein if the ARAPP percentage for the first communication device is not greater than the ARAPP percentage for the second communication device, the ARAPP unit determines if the IP address was previously discovered, wherein if the IP address was not previously discovered, the IP address is given to the first communication device, otherwise the ARAPP unit denies the IP address request from the first communication device.

11. The apparatus of claim 9, wherein the ARAPP unit determines if the first communication device is claiming to own IP addresses above its IP address limit.

12. The apparatus of claim 9,
wherein the ARAPP unit determines if at least one of an IP address and a MAC address exists on a switchport.

* * * * *